April 25, 1939.  C. J. WHITE  2,156,213
ANIMAL TRAP
Filed April 14, 1938   2 Sheets-Sheet 2
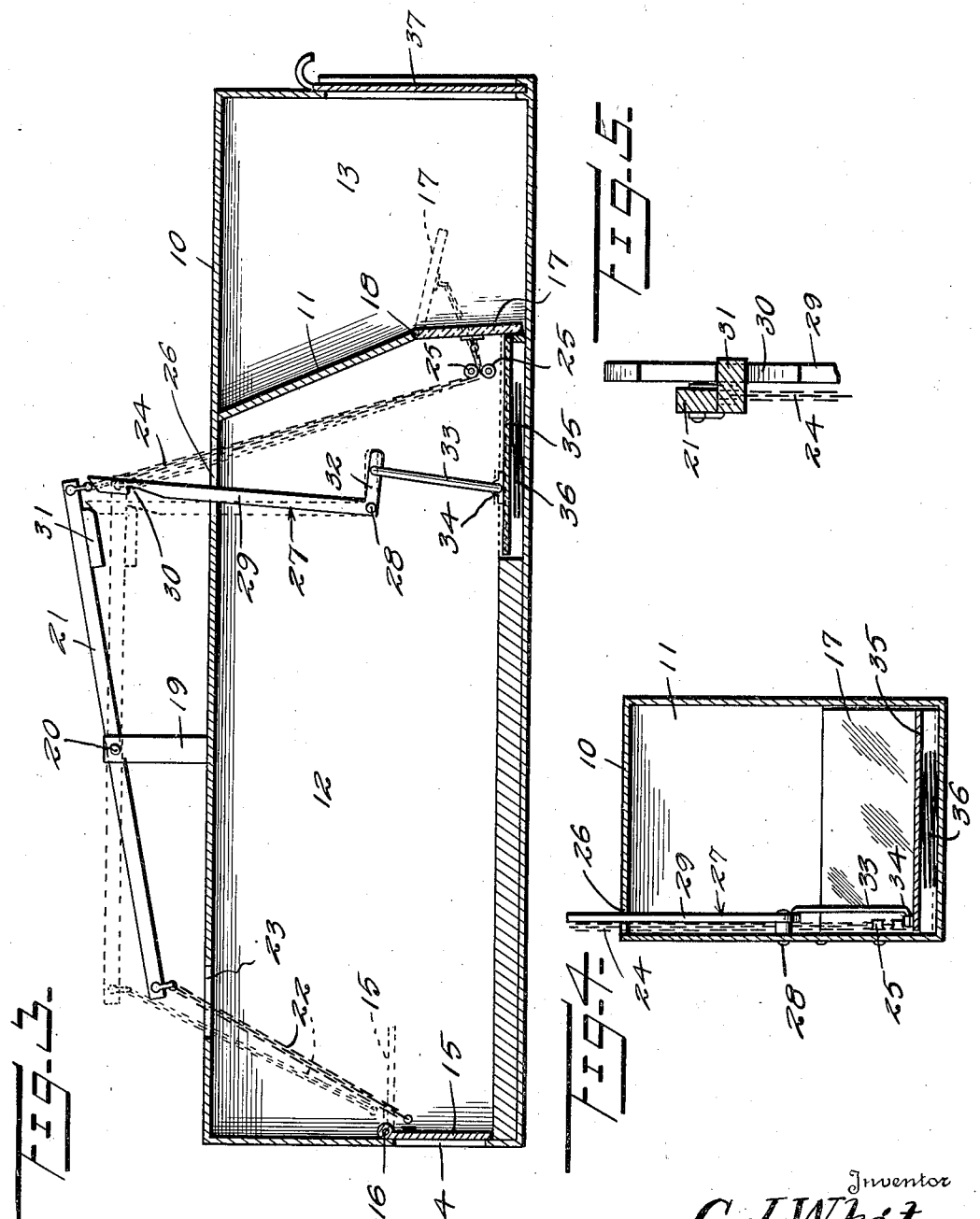
Inventor
C. J. White
By L. F. Kambuyh
Attorney Patented Apr. 25, 1939

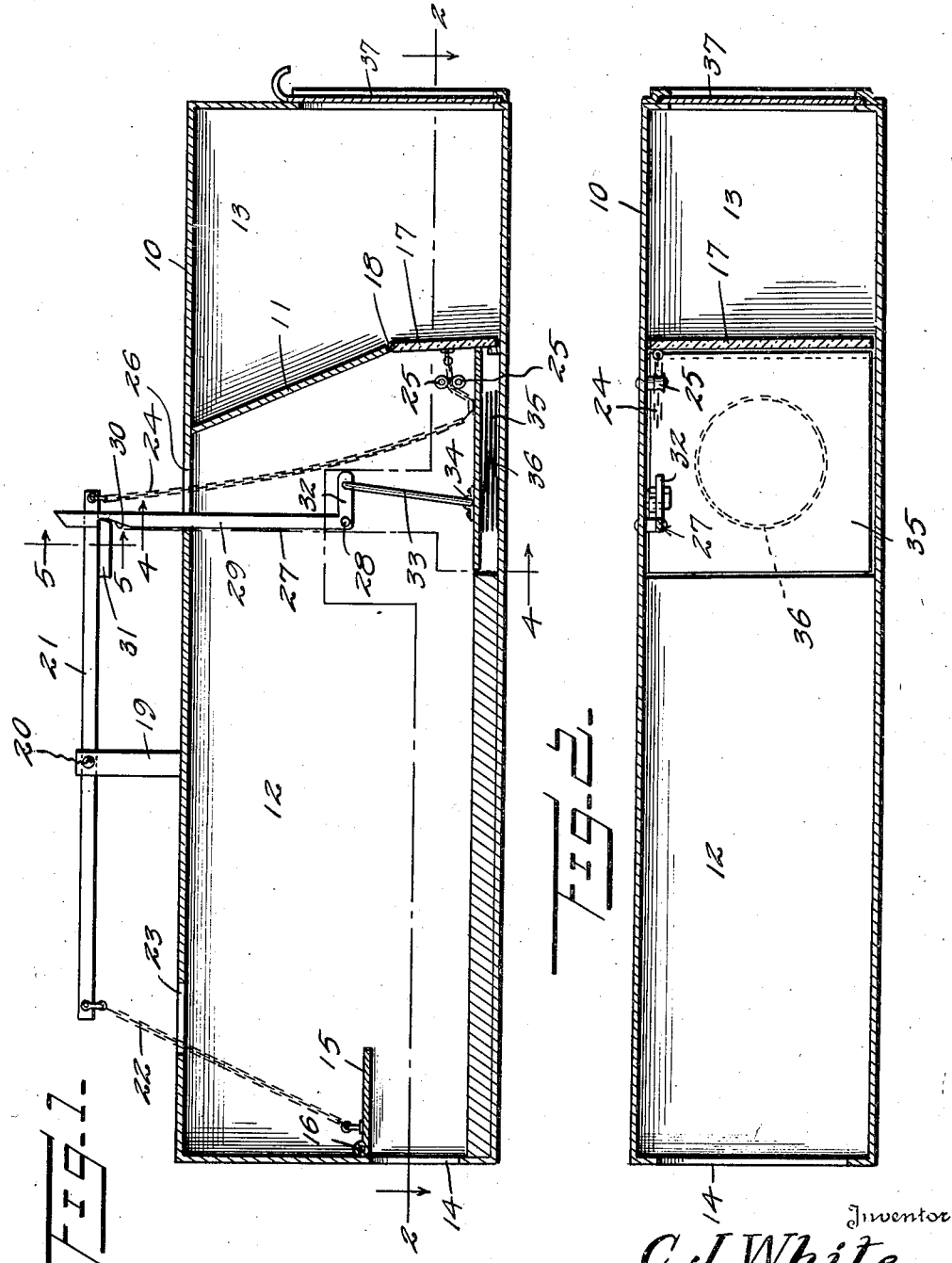

2,156,213

UNITED STATES PATENT OFFICE 2,156,213

ANIMAL TRAP

Charles J. White, Longview, Tex.

Application April 14, 1938, Serial No. 202,122

2 Claims. (Cl. 43—76)

This invention relates to an animal trap and more particularly to one designed to catch rodents.

One important object is to provide such a trap wherein the same may be used to catch any desired number of the rodents and wherein they will be caught one at a time, and the trap automatically reset after entrance of a rodent into the same.

The more specific objects and advantages will become apparent from a consideration of the description following taken in connection with accompanying drawings illustrating an operative embodiment.

In said drawings:

Figure 1 is a vertical longitudinal sectional view taken through the trap;

Figure 2 is a horizontal section taken on the plane of line 2—2 of Figure 1;

Figure 3 is a view similar to Figure 1 but showing the main door of the trap closed or in the position it assumes after entry of a rodent;

Figure 4 is a cross section taken on the line 4—4 of Figure 1, and

Figure 5 is a cross section taken on the line 5—5 of Figure 1.

Referring specifically to the drawings wherein like reference characters designate like or similar parts, the trap includes a casing, box or receptacle 10 of any desired shape and material. A partition 11 is provided within the casing to define an entrance chamber 12 and a captive chamber 13. Bait may be disposed at any suitable location within the entrance chamber 12.

The rodents may enter through an opening 14 in one end wall of the casing 10, which opening is adapted to be closed at times by a plate or closure 15 mounted on a horizontal pintle 16.

Between the entrance chamber 12 and captive chamber 13 is a closure plate or gate 17 which is pivoted on a horizontal axis at 18 to the lower edge of the partition 11. Rodents pass from the chamber 12 to the chamber 13 through the space below the partition 11 and which is adapted to be closed by said gate 17.

A post 19 rises from the casing 10 and a pivot member 20 connects a lever 21 thereto. Such lever has a chain 22 fastened to it and also fastened to the closure or gate 15, passing downwardly through an opening 23 in the top of the casing. The other end of said lever 21 has a chain 24 connected thereto and also connected to the closure 17, preferably passing between and being guided by rollers 25 secured to one side wall of the casing 10. While the elements 22 and 24 have been referred to as chains, they may be any equivalent flexible means.

Said chain 24 passes through an opening 26 in the top of the casing 10 and operable in said opening is a trigger 27 in the form of a bell crank lever pivoted at 28 to a side wall of the casing. The longer arm of said lever as at 29, is upstanding and has a notch at 30 adapted to engage a projection 31 extending laterally from lever 21 adjacent one end thereof. The shorter arm 32 of said bell crank lever 27 has a link 33 pivoted thereto and also pivoted at 34 to a downwardly slidable false bottom member or platform 35, supported on a coil or other spring 36.

The closure member 17 is transparent, being made of glass or any synthetic resinous or similar material.

Said captive chamber 13 has a discharge opening which is normally covered by a slidably mounted closure 37.

The device may be used with the closure 37 in place or the same may be arranged in communication with another receptacle serving as an enlargement or extension of the captive chamber 13, as preferred.

Presuming operation, the parts are in the position shown in Figure 1 where closure 15 is open and closure 17 is closed. A suitable bait is located within the receiving chamber 12. The rodent attracted by the bait will enter through the opening 14, and tread upon the platform 35, since the bait is beyond link 33. The weight of the rodent will lower the platform 35, thereby moving the link 33 and shifting the trigger from the full line position of Figure 1, which is the dotted line position of Figure 3, to the full line position of Figure 3, thereby releasing the lever 21 and enabling the closure 15 to close by gravity into the closed position of Figure 3. The entrapped rodent being taken by surprise and fear, and being able to see through the transparent closure 17, will dash for it, contacting and swinging it from the full line to the dotted line position of Figure 5, which will draw on the chain 24, since the same becomes substantially taut when the closure 15 is in closed position. Such pull on chain 24, will cause lever 21 to lower with element 31 engaging the upper end of the arm 29, and snapping element 31 into the notch 30, permitted by the action of spring 35. At the same time, the movement of lever 21 will raise chain 22 and open closure 15, thus resetting the trap through the movement of the captive rodent.

Various changes may be resorted to provided they fall within the spirit and scope of the invention.

I claim as my invention:

1. A trap of the class described having a casing provided with a receiving chamber and a captive chamber, a closure movably mounted to control communication between the chambers, the receiving chamber having an entrance and a closure movably mounted to cover and expose the same, a lever mounted on the trap, a connection between the second mentioned closure and the lever, trip means operable under the weight of a rodent, the first mentioned closure being engageable by the rodent, a connection between the lever and first mentioned closure, to actuate the lever to restore the second mentioned closure to open position, said trip means comprising a bell crank lever having a notch engageable with the first mentioned lever, a false bottom over which the rodent may travel, a connection between the false bottom and bell crank lever, a spring normally maintaining the false bottom in raised position and urging the bell crank lever into position for engaging the first mentioned lever.

2. A trap of the class described having a casing provided with a receiving chamber and a captive chamber, a closure movably mounted to control communication between the chambers, the receiving chamber having an entrance and a closure movably mounted to cover and expose the same, a lever mounted on the trap, a connection between the second mentioned closure and the lever, trip means operable under the weight of a rodent, the first mentioned closure being engageable by the rodent, a connection between the lever and first mentioned closure, to actuate the lever to restore the second mentioned closure to open position, said trip means comprising a bell crank lever having a notch engageable with the first mentioned lever, a false bottom over which the rodent may travel, a connection between the false bottom and bell crank lever, a spring normally maintaining the false bottom in raised position and urging the bell crank lever into position for engaging the first mentioned lever, the first mentioned lever being exterior of the casing, said first mentioned connections being flexible elements, guide means for the flexible elements adjacent the first mentioned closure.

CHARLES J. WHITE.